United States Patent
Willis

(10) Patent No.: US 8,186,303 B1
(45) Date of Patent: May 29, 2012

(54) MULTIPLE STATION ANIMAL FEEDING APPARATUS

(76) Inventor: Margaret A. Willis, Anderson, MO (US)

( * ) Notice: Subject to any disclaimer, the term of this patent is extended or adjusted under 35 U.S.C. 154(b) by 261 days.

(21) Appl. No.: 12/690,965

(22) Filed: Jan. 21, 2010

(51) Int. Cl.
*A01K 9/00* (2006.01)

(52) U.S. Cl. .......... 119/71; 119/72.5

(58) Field of Classification Search ............ 119/71, 119/72, 72.5, 75, 449, 454, 456, 464, 475, 119/515, 521, 51.01, 51.5, 51.03; 215/395; D30/121, 132; 248/102, 103, 105, 106, 371, 248/146, 148, 149, 312
See application file for complete search history.

(56) References Cited

U.S. PATENT DOCUMENTS

| | | | |
|---|---|---|---|
| 729,688 A * | 6/1903 | Smith et al. | 119/71 |
| 886,485 A * | 5/1908 | Espy | 119/71 |
| 898,878 A * | 9/1908 | Grunenwald | 119/71 |
| 1,630,982 A * | 5/1927 | Stone | 119/71 |
| 2,506,205 A * | 5/1950 | Fry | 119/71 |
| 3,042,002 A * | 7/1962 | Liell | 119/71 |
| D245,029 S * | 7/1977 | Hedstrom | D30/132 |
| 4,214,554 A * | 7/1980 | Smith, Jr. | 119/71 |
| 4,620,505 A | 11/1986 | Thomson et al. | |
| 5,188,061 A | 2/1993 | Lombardi | |
| 5,463,981 A | 11/1995 | Marcinko et al. | |
| D392,776 S * | 3/1998 | Trossevin et al. | D30/121 |
| 5,816,193 A | 10/1998 | Haggerty | |
| 6,684,815 B1 * | 2/2004 | Rakoczy | 119/72 |
| 6,752,103 B1 | 6/2004 | Howell | |
| 6,817,314 B1 | 11/2004 | Conte | |
| 7,337,746 B2 | 3/2008 | Clark et al. | |
| 7,971,552 B1 * | 7/2011 | Rakoczy | 119/72 |
| 8,056,508 B1 * | 11/2011 | Bryan et al. | 119/71 |
| 2006/0278598 A1 | 12/2006 | Song | |

* cited by examiner

*Primary Examiner* — T. Nguyen
(74) *Attorney, Agent, or Firm* — Montgomery Patent & Design, LLC; Robert C. Montgomery; Joseph T. Yaksich

(57) ABSTRACT

A multiple station feeding apparatus for nursing young domestic pets, providing a hands-free feeding means thereof, is herein disclosed. The apparatus comprises an angled textile covered base ramp upon which the pets stand or lie in a linear arrangement. At the top of the ramp is a bottle holding panel which supports standard pet feeding bottles by inserting them through a circular opening in the frame and securing the bottles with a slip-on locking panel. At this point the pets can feed in much the same arrangement as would be found when nursing from their mother. When completed, the bottles are easily removed and cleaned. These features provide for a rapid simultaneous feeding of pets compared thereto feeding pets individually.

14 Claims, 3 Drawing Sheets

MULTIPLE STATION ANIMAL FEEDING APPARATUS

RELATED APPLICATIONS

The present invention was first described in a notarized Official Record of Invention filed on Jan. 28, 2009 at the offices of Montgomery Patent and Design. There are no previously filed, nor currently any co-pending applications, anywhere in the world.

FIELD OF THE INVENTION

The present invention relates generally to animal feeding devices, and in particular, to a device to assist in the feeding of multiple domesticated animals in a simultaneous fashion.

BACKGROUND OF THE INVENTION

As the population continues to increase, so to does the number of domesticated animals populating the world. Also correspondingly, there exists an ever-increasing number of stray and orphaned animals which are tended to by animal shelters. All of these animals which live under the care of humans require daily care on the part of the caretaker. In particular, many such domesticated or house ridden animals require on their human caretakers for feeding and nourishment.

The process of feeding animals such as dogs and cats can be a very time consuming one. Young pets in particular require particular care. If raised without the presence of their parent, puppies, kittens, and the like are often fed by means of bottles. The process of preparing their food, filling the bottles, feeding the animals, and cleaning up afterward can be extremely time-consuming. The task becomes particularly untenable with litters of puppies. The task of individually feeding each pet is extremely time-consuming, and the individual feeding method also counteracts their natural instinct of the litter nursing process.

Various attempts have been made to provide devices which aid in the nursing of young animals. Examples of these attempts can be seen by reference to several U.S. patents. U.S. Pat. No. 5,463,981, issued in the name of Marcinko et al., describes a stuffed animal nursing device. The Marcinko device takes the appearance of a mature animal of the correct species in order to entice a young animal to feed.

U.S. Pat. No. 6,817,314, issued in the name of Conte, describes a free standing support for a positional bottle feeder. The Conte device is a stabilizing support for a common bottle feeding device for domesticated animals.

U.S. Pat. No. 7,337,746, issued in the name of Clark et al., describes a small animal feeding station. The Clark device utilizes a plurality of specialized bottles to provide a wall mountable feeding station for small animals.

While these devices fulfill their respective, particular objectives, each of these references suffer from one (1) or more of the aforementioned disadvantages. Many such devices are not easily operated by a single user in a manner which saves time. Also, many such devices do not allow a nursing animal to lie in a natural nursing position during feeding. In addition, many such devices are not adaptable to a full litter of animals. Furthermore, many such devices are not readily portable or movable. Finally, many such devices do not provide a stable, lockable means which allows for the safe, unattended feeding of nursing animals. Accordingly, there exists a need for a multiple feeding apparatus for pets without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to easily and safely feed multiple nursing animals in a time saving manner which also provides a natural, comfortable feeding position for the animals. Thus, the object of the present invention is to solve the aforementioned disadvantages and provide for this need.

To achieve the above objectives, it is an object of the present invention to comprise a base, a mounting panel, a plurality of bottles, a plurality of bottle collars, a plurality of nipples, and a locking panel. The mounting panel is located along a top edge of the base and further comprises a plurality of apertures. In a preferred embodiment, the base and panels are of a size and material construction which allows the apparatus to be easily transported.

Another object of the present invention is to further comprise the mounting panel of a rectangular flat panel oriented in a vertical plane. The plurality of apertures is arranged along the mounting panel in a horizontal linear fashion.

Yet still another object of the present invention is to comprise the base of an "L"-shaped inclined platform having a short leg portion oriented in a vertical manner. The platform is attached to a rear surface of the mounting panel. The base further comprises a matted upper surface which is comfortable to an animal laying on the platform.

Yet still another object of the present invention is for the locking panel to slidingly engage with the mounting panel. The locking panel further comprises a plurality of inverted "U"-shaped notch portions opening along a lower edge. The slots are adapted to trap the bottles at a desired feeding position by engaging them behind the bottle collars.

Yet still another object of the present invention is to further comprise the mounting panel of a plurality of height adjusting slots. These slots allow a user to adjust the locking panel up and down the base in a vertical manner.

Yet still another object of the present invention is to comprise each bottle of a necked-down region located behind the bottle collar. This allows the bottles to be securely held in place by sliding the locking panel along a forward face of the mounting panel so that the notch portions of the panel engage the necked-down portions of the bottles.

Yet still another object of the present invention is to provide a method of utilizing the device that provides a unique means of securely and simultaneously feeding a litter of young animals in a manner which simulates their natural nursing tendencies, while also saving substantial time for a user as compared to feeding the animals individually by hand.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
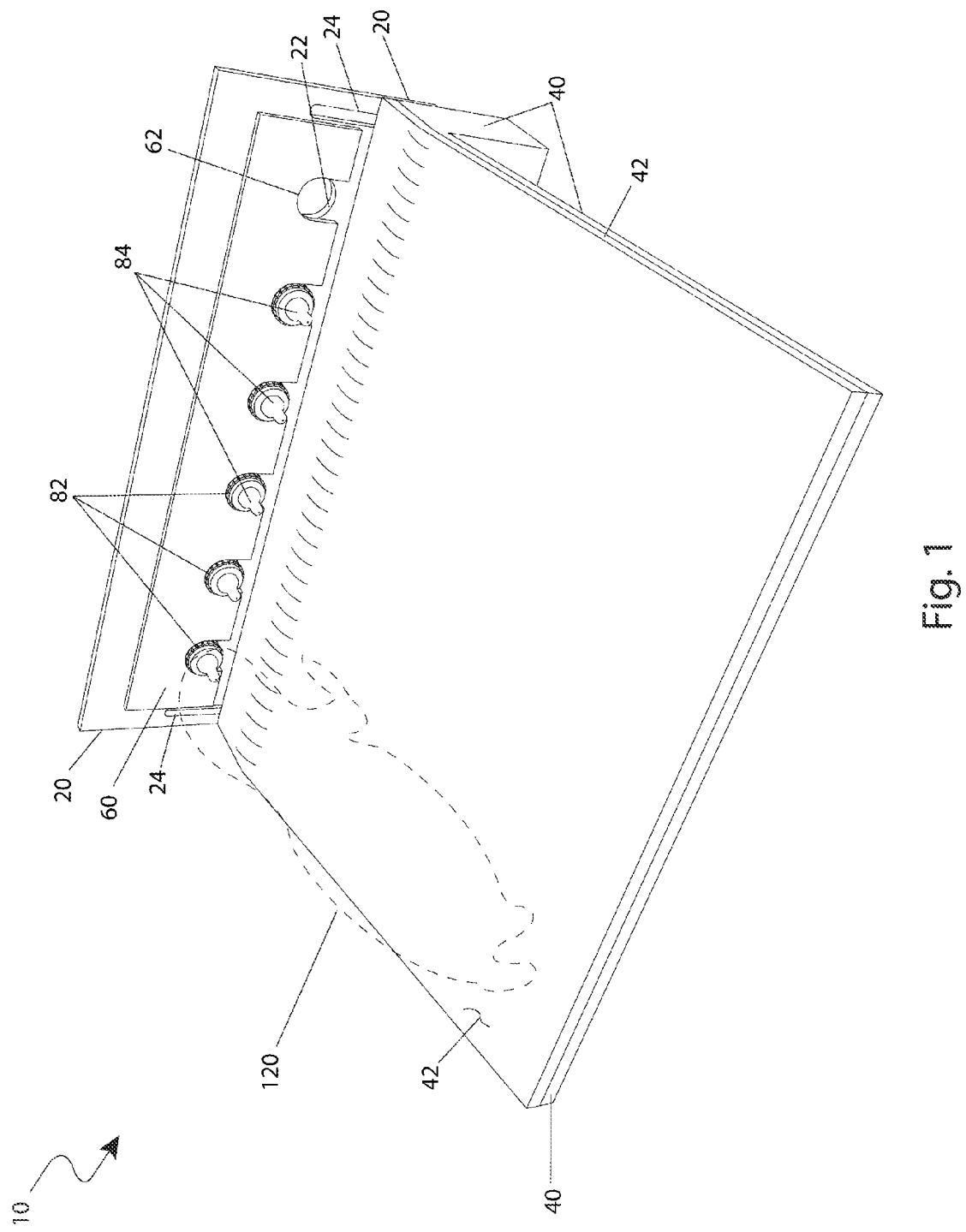
FIG. 1 is a front perspective view of a multiple feeding apparatus for pets 10, according to a preferred embodiment of the present invention.

DESCRIPTIVE KEY 10 multiple feeding apparatus for pets
20 mounting panel
22 bottle aperture
24 height adjustment slot
40 base
42 high-friction surface
44 stud fastener
60 locking panel
62 locking panel notch
80 bottle
82 collar
84 nipple
86 dimension 'B'
90 fluid
100 washer
105 wing nut
120 pet

DETAILED DESCRIPTION OF THE PREFERRED EMBODIMENT

Figure 2:
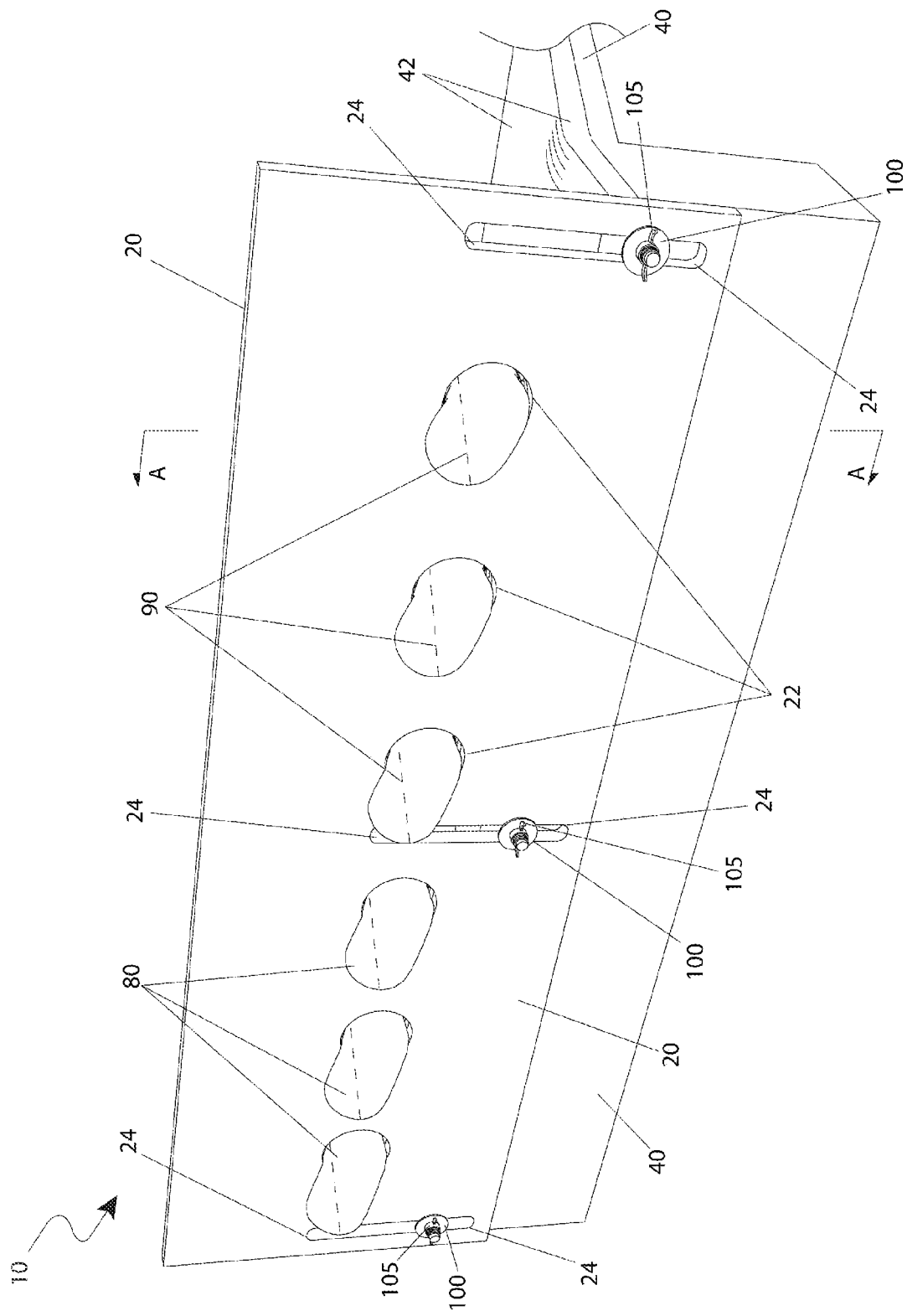
FIG. 2 is a rear perspective view of the multiple feeding apparatus for pets 10, according to a preferred embodiment of the present invention; and, FIG. 3 is a section view taken along section line A-A (see FIG. 1) of the multiple feeding apparatus for pets 10, according to a preferred embodiment of the present invention.
Figure 3:
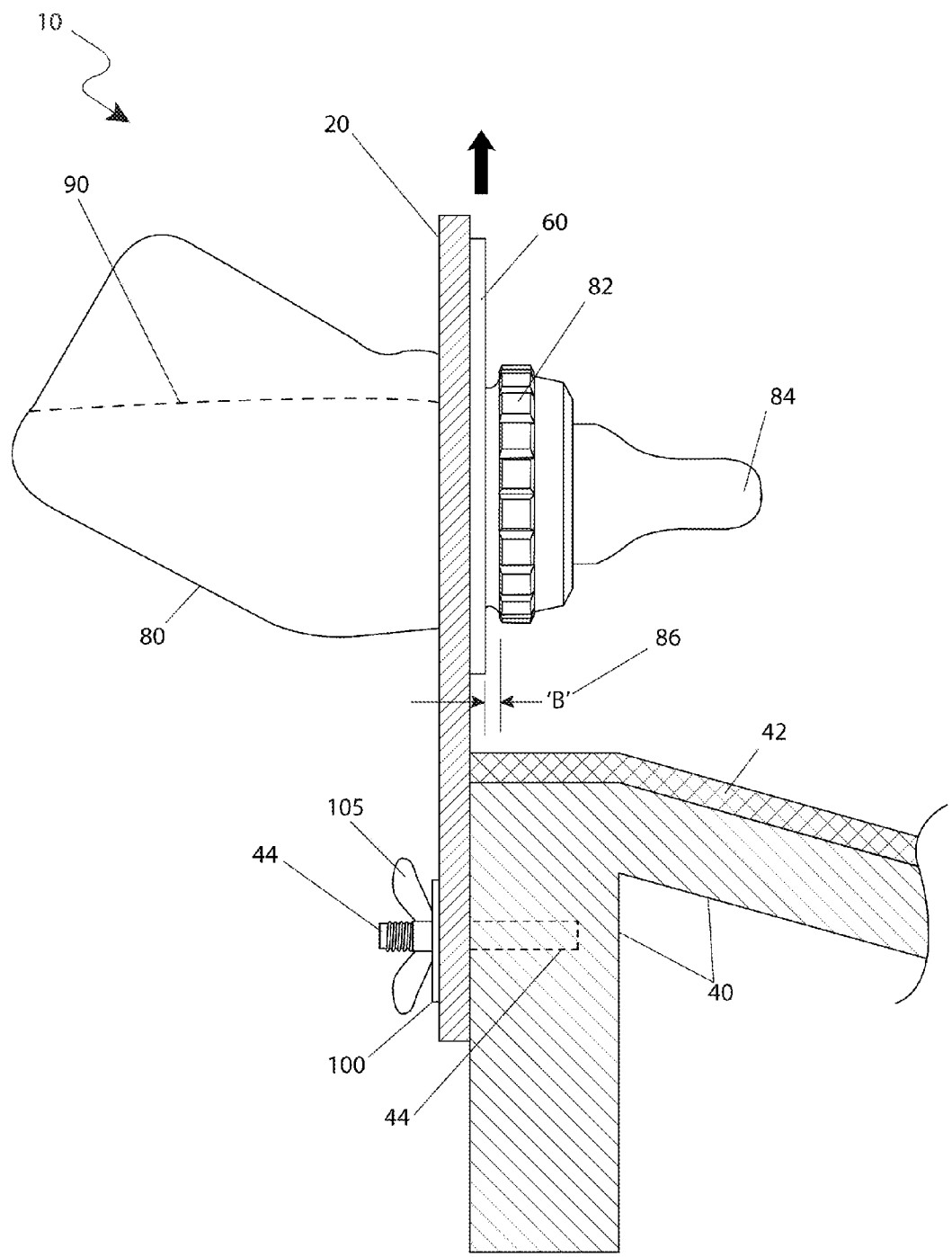

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a multiple feeding apparatus for pets (herein described as the "apparatus") 10, which provides a multiple hands-free feeding means for nursing domestic pets 120. The apparatus 10 provides a feeding means for up to and including six (6) pets 120; however, it is understood that the apparatus 10 may be introduced having a smaller or larger number of feeding positions. The apparatus 10 comprises an inclined base 40 upon which said pets 120 may stand or lie in a parallel arrangement. Located along a top edge of the base 40 is a bottle mounting panel 20 which holds six (6) standard pet feeding bottles 80. The bottles 80 are inserted therethrough respective apertures 22 and secured thereto the mounting panel 20 via a slip-on locking panel 60, thereby allowing a plurality of pets 120 to feed in much the same manner as when nursing from their mother. When a feeding of the pets 120 is completed, the bottles 80 are easily removed and cleaned. The aforementioned features provide for rapid simultaneous feeding of pets 120 rather than feeding said pets 120 in an individual fashion.

Referring now to FIG. 1, a front perspective view of the apparatus 10, according to a preferred embodiment of the present invention, is disclosed. The apparatus 10 comprises a mounting panel 20, a base 40, a locking panel 60, six (6) bottle collars 82, and six (6) nipples. The mounting panel 20 comprises a rectangular flat panel further comprising six (6) bottle apertures 22. The mounting panel 20 provides a positioning and securing means thereto six (6) bottles 80 which protrude therethrough said apertures 22, thereby providing a comfortable feeding arrangement thereto nursing pets 120 positioned thereupon the base 40. Said bottle apertures 22 are arranged in a horizontal linear fashion allowing up to, and including, six (6) pets to lie or stand thereupon while feeding therefrom said bottles 80. The bottles 80 are held in a desired protruding position via the locking panel 60 (see FIGS. 2 and 3).

The base 40 comprises an "L"-shaped inclined platform approximately twenty-four (24) to thirty (30) inches wide and approximately sixteen (16) inches deep and is envisioned to provide space for six (6) nursing pets 120 such as puppies or other nursing pets 120. The short leg portion of the base 40 is orientated in a vertical manner providing an attachment means thereto the aforementioned mounting panel 20 along a rear surface thereof (see FIGS. 2 and 3). The base 40 also provides an attachment means thereto a high-friction surface 42 therealong an upper surface thereof, thereby providing improved traction and comfort thereto occupying pets 120 as well as helping to stabilize said pets 120 during feeding. Said high-friction surface 42 is envisioned to be made using materials such as, but not limited to: a rubber mat, carpeting, textile fabrics, and the like, being securely affixed thereto a top surface of the base 40 using adhesives, screws, rivets, or the like.

Once a desired number of bottles 80, collars 82, and nipples 84 are inserted therethrough the bottle apertures 22, the locking panel 60 is slidingly engaged slightly behind the collar portion 82 of each bottle 80, thereby mechanically engaging a locking panel slot portion 62 of the locking panel 60 therewith each bottle 80. The locking panel slot 62 comprises an inverted "U"-shaped opening along a lower edge of said locking panel 60 having a width and depth being slightly less than that of the bottle collar 82 and being geometrically matched thereto a profile portion of said bottle 80, thereby trapping the bottle 80 thereat a desired feeding position (see FIG. 3).

The mounting panel 20, the base 40, and the locking panel 60 are envisioned being made using rugged extruded or molded plastic materials being easily washed and/or disinfested. Additionally, said portions 20, 40, 60 are envisioned to be introduced in a variety of decorative colors and patterns based upon a user's preferences.

Referring now to FIG. 2, a rear perspective view of the apparatus 10, according to a preferred embodiment of the present invention, is disclosed. The apparatus 10 comprises three (3) height adjustment slots 24, six (6) bottles 80, and a securing means. The apparatus 10 provides a height adjusting means to enable vertical positioning of the mounting panel 20 based on a size of the pets 120 as well as allowing needed adjustment as the pets 120 continue to grow until such time they are weaned. The height adjusting slots 24 slide vertically up and down thereupon three (3) studs 44 which protrude therefrom the base 40, thereby allowing a motioning of the mounting panel 20 in a guided vertical direction. The mounting panel 20 is then secured thereat a desired height using the securing means such as washers 100, and wing nuts 105 in an expected manner (see FIG. 3).

Referring now to FIG. 3, a section view taken along section line A-A (see FIG. 1) of the apparatus 10, according to a preferred embodiment of the present invention, is disclosed. The apparatus 10 comprises a mounting panel 20, a locking panel 60, a bottle 80, a bottle collar 82, and a nipple 84. The bottle 80 comprises a necked-down region adjacent and slightly behind the collar portion 82 which provides an attachment means using the locking panel 60. Said bottle 80 is held securely by sliding the locking panel 60 downwardly along a forward facing surface of the mounting panel 20, thereby allowing the locking panel notch portion 62 of said locking panel 60 to mechanically engage the necked-down portion of the bottle 80 as indicated by dimension "B" 86 (see FIG. 1).

The bottle 80 comprises a conventional liquid reservoir suitable for delivering a nursing fluid 90 such as milk, formula, water, or the like. The bottle 80 comprises an angled design, thereby providing consistent gravity-aided flow until empty. The bottle 80, collar 82, and nipple 84 are envisioned being similar to conventional angled baby bottles such as PLAYTEX VENTAIR®, or equivalent unit.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of installing, adjusting, and utilizing the apparatus 10 may be achieved by performing the following steps: placing the apparatus 10 thereupon a flat stable surface such as a floor, counter, or the like; filling a plurality of bottles 80 with a desired fluid 90 such as milk, formula, water, or the like; inserting the filled bottles 80 therethrough the bottle apertures 22 until reaching a mechanical limit against the mounting panel 20; rotating said bottles 80 so as to position the angled portion of the bottle 80 in an upward orientation; sliding the locking panel 60 downwardly along a forward facing surface of the mounting panel 20 until the locking panel slots 62 are seated thereagainst the necked-down portion of each bottle 80; adjusting the height of the mounting panel 20 by loosening the wing nuts 105; sliding the mounting panel 20 in a vertical direction thereto a suitable position which corresponds thereto a size of the intended pets 120; securing said mounting panel 20 in place by tightening said wing nuts 105 securely; placing the pets 120 thereupon the high-friction surface 42 of the base 40; guiding mouth portions of each pet 120 thereto the nipple portion 84 of the bottle 80; allowing said pets 120 to nurse for a desired period or until said bottles 80 are depleted of contained fluids 90; repeating the filling and nursing steps described above as required based upon feeding requirements of said pets 120; and, benefiting from time saved using the present invention 10 as compared thereto feeding said pets 120 in an individual fashion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hands-free multi-pet feeding apparatus comprising:
   a base situated at an inclined position;
   a mounting panel located along a top edge of said base and having a plurality of apertures formed therein;
   a plurality of bottles;
   a plurality of bottle collars;
   a plurality of nipples removably attached to said bottle collars respectively; and,
   a locking panel slipped-on to said mounting panel in such a manner that said bottle collars and said nipples are maintained at substantially stable positions after protruding through said apertures;
   wherein said locking panel is slidingly engaged with said mounting panel and remains disposed behind said bottle collars, said locking panel including a plurality of inverted "U"-shaped notch portions opening along a lower edge of said locking panel and having a width and a depth slightly less than a width and a depth of said bottle collars respectively, said "U"-shaped slots being adapted to trap the bottles at a desired feeding position.

2. The hands-free multi-pet feeding apparatus of claim 1, wherein said mounting panel comprises: a rectangular flat panel.

3. The hands-free multi-pet feeding apparatus of claim 1, wherein said bottle apertures are arranged in a horizontal linear fashion.

4. The hands-free multi-pet feeding apparatus of claim 1, wherein said base comprises: an "L"-shaped inclined platform having a short leg portion orientated in a vertical manner and attached to a rear surface of said mounting panel.

5. The hands-free multi-pet feeding apparatus of claim 1, wherein said base further comprises: a matted upper surface.

6. The hands-free multi-pet feeding apparatus of claim 1, further comprising a plurality of height adjusting slots formed within said mounting panel for adjustably affixing said locking panel vertically up and down said base.

7. The hands-free multi-pet feeding apparatus of claim 6, wherein each of said bottles comprises: a necked-down region located adjacent and behind said bottle collar such that said bottles are securely held in place by downwardly sliding said locking panel along a forward facing surface of said mounting panel;
   wherein notch portions of said locking panel mechanically engage said necked-down portions of said bottles respectively.

8. A hands-free multi-pet feeding apparatus comprising:
   a portable base situated at an inclined position;
   a portable mounting panel located along a top edge of said base and having a plurality of apertures formed therein;
   a plurality of bottles;
   a plurality of bottle collars;
   a plurality of nipples removably attached to said bottle collars respectively; and,
   a portable locking panel slipped-on to said mounting panel in such a manner that said bottle collars and said nipples are maintained at substantially stable positions after protruding through said apertures;
   wherein said locking panel is slidingly engaged with said mounting panel and remains disposed behind said bottle collars, said locking panel including a plurality of inverted "U"-shaped notch portions opening along a lower edge of said locking panel and having a width and a depth slightly less than a width and a depth of said bottle collars respectively, said "U"-shaped slots being adapted to trap the bottles at a desired feeding position.

9. The hands-free multi-pet feeding apparatus of claim 8, wherein said mounting panel comprises: a rectangular flat panel.

10. The hands-free multi-pet feeding apparatus of claim 8, wherein said bottle apertures are arranged in a horizontal linear fashion.

11. The hands-free multi-pet feeding apparatus of claim 8, wherein said base comprises: an "L"-shaped inclined platform having a short leg portion orientated in a vertical manner and attached to a rear surface of said mounting panel.

12. The hands-free multi-pet feeding apparatus of claim 8, wherein said base further comprises: a matted upper surface.

13. The hands-free multi-pet feeding apparatus of claim 8, further comprising a plurality of height adjusting slots formed within said mounting panel for adjustably affixing said locking panel vertically up and down said base.

14. The hands-free multi-pet feeding apparatus of claim 13, wherein each of said bottles comprises: a necked-down region located adjacent and behind said bottle collar such that said bottles are securely held in place by downwardly sliding said locking panel along a forward facing surface of said mounting panel;

wherein notch portions of said locking panel mechanically engage said necked-down portions of said bottles respectively.

* * * * *